United States Patent
Liu et al.

(10) Patent No.: US 7,283,183 B2
(45) Date of Patent: Oct. 16, 2007

(54) PIXEL STRUCTURE AND METHOD OF REPAIRING THE SAME

(75) Inventors: Wen-Hsiung Liu, Pingtung County (TW); Chien-Chih Jen, Taipei (TW); Chien-Kuo He, Taipei County (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 0 days.

(21) Appl. No.: 11/563,028

(22) Filed: Nov. 24, 2006

(65) Prior Publication Data

US 2007/0085940 A1 Apr. 19, 2007

Related U.S. Application Data

(62) Division of application No. 10/711,837, filed on Oct. 8, 2004, now Pat. No. 7,193,664.

(51) Int. Cl.
*G02F 1/1333* (2006.01)
*G02F 1/1343* (2006.01)

(52) U.S. Cl. .................. 349/54; 349/55; 349/146; 349/143

(58) Field of Classification Search .............. 349/54, 349/55, 143, 146
See application file for complete search history.

(56) References Cited

U.S. PATENT DOCUMENTS 5,303,074 A * 4/1994 Salisbury ............... 349/55
6,856,374 B1 * 2/2005 Ozaki et al. ........... 349/192

* cited by examiner

*Primary Examiner*—Mike Qi
(74) *Attorney, Agent, or Firm*—Jianq Chyun IP Office

(57) ABSTRACT

A pixel structure and a method of repairing the same are provided. The pixel structure includes a scan line, a data line, a thin film transistor, a pixel electrode, a common line and a dielectric layer. The common line adjacent to the data line serves as a repairing section, the repairing section includes a first repairing terminal, a second repairing terminal and a cutting region, the first repairing terminal and the second repairing terminal are disposed under the data line and the cutting region is disposed between the first repairing terminal and the section of the common line that does not extend along the data line, and the pixel electrode does not cover the cutting region.

5 Claims, 10 Drawing Sheets

US 7,283,183 B2

PIXEL STRUCTURE AND METHOD OF REPAIRING THE SAME

CROSS-REFERENCE TO RELATED APPLICATION

This is a divisional application of patent application Ser. No. 10/711,837, filed on Oct. 8, 2004 now U.S. Pat. No. 7,193,666. The entirety of the above-mentioned patent application is hereby incorporated by reference herein and made a part of this specification.

BACKGROUND OF THE INVENTION

1. Field of the Invention

The present invention relates to a pixel structure and a method of repairing the same. More particularly, the present invention relates to a pixel structure and a repairing method capable of repairing broken data lines and defective pixels.

2. Description of Related Art

To meet the life style of modern people, video or imaging devices are increasingly being developed to be light and compact. Although the conventional cathode ray tube (CRT) display has some advantages, it has the disadvantages large space occupation and high power comsumption. With great advances in the techniques of fabricating optical-electronic and semiconductor devices, flat panel displays such as thin film transistor liquid crystal displays (TFT LCD) have currently become the dominant display products.

Thin film transistor liquid crystal display mainly comprises a thin film transistor array substrate, a color-filtering array substrate and a liquid crystal layer. The thin film transistor array substrate comprises an array of thin film transistors with each thin film transistor having a pixel electrode. The thin film transistor serves as a switch for turning each pixel unit on or off. Furthermore, each pixel unit is controlled through one of scan lines and one of data lines.

FIG. 1 is a top view of a conventional pixel structure. As shown in FIG. 1, the pixel structure 100 essentially comprises a scan line 110, a thin film transistor 120, a pixel electrode 130, a data line 140, a common line 150 and a dielectric layer (not shown).

The scan line 110 and the thin film transistor 120 are disposed on the substrate 10. The thin film transistor 120 comprises a gate 122, a source 124 and a drain 126. The gate 122 is electrically connected to the scan line 110. The data line 140 is disposed over the substrate 10 and is electrically connected to the source 124. The pixel electrode 130 is disposed over the substrate 10 and is electrically connected to the drain 126. The thin film transistor 120 can transmit signals on the data line 140 to the pixel electrode 130 via selective control of the scan line 110.

The dielectric layer (not shown) is disposed on the substrate 10 to cover the scan line 110 so that the scan line 110 and the data line 140 are electrically isolated from each other. The common line 150 is disposed on the substrate 10 and to readily receive a common voltage. The pixel electrode 130 covers a portion of the common line 150. Furthermore, the aforementioned dielectric layer is also disposed between the pixel electrode 130 and the common line 150 so that a storage capacitor is formed in the overlapping region between the pixel electrode 130 and the common line 150. Hence, each pixel of liquid crystal display can have a memory/register function.

It should be noted that pixel defects or broken lines might be formed after the aforementioned process. Since the aforementioned pixel structure design includes no mechanism for repairing any defective pixels or any broken data lines, nothing can be done if such defects occur.

SUMMARY OF THE INVENTION

Accordingly, the present invention is directed to a pixel structure and a method of repairing broken data lines and defective pixels thereof.

The pixel structure according to an embodiment of the present invention comprises a scan line, a data line, a thin film transistor, a pixel electrode, a contact block, a first repairing pattern and a second repairing pattern and a dielectric layer. The scan line and the data line are disposed over a substrate. The thin film transistor is also disposed over the substrate. The thin film transistor further comprises a gate, a source and a drain. The gate is electrically connected to the data line. Similarly, the source is electrically connected to the data line. The pixel electrode is disposed over the substrate and is electrically connected to the drain. The contact block is disposed under the pixel electrode and is electrically connected to the pixel electrode. The first repairing pattern is disposed over the substrate. One end of the repairing pattern is disposed under the data line while the other end of the first repairing pattern is disposed under the drain. The second repairing pattern is disposed on the substrate. One end of the second repairing pattern is disposed under the data line while the other end of the second repairing pattern is disposed under the contact block. The dielectric layer is disposed over the substrate to cover at least the first repairing pattern and the second repairing pattern.

The present invention also provides a method of repairing the aforementioned pixel structure. A laser beam is applied to fuse the respective ends of the first repairing pattern so that the first repairing pattern electrically connects with the data line as well as the drain. Alternatively, a laser beam is applied to fuse the respective ends of the second repairing pattern so that the second repairing pattern electrically connects with the data line and the contact block. Ultimately, the defective pixel is repaired. In addition, the laser beam can be applied to fuse the ends of the first repairing pattern and the ends of the second repairing pattern so that the first repairing pattern electrically connects with the data line and the drain, and the second repairing pattern electrically connects with the data line and the contact block to repair a broken data line.

The present invention is also directed to an alternative pixel structure. The pixel structure according to another embodiment of the present invention comprises a scan line, a data line, a thin film transistor, a pixel electrode and a common line and a dielectric layer. The scan line and the data line are disposed over a substrate. The thin film transistor is disposed over the substrate. The thin film transistor comprises a gate, a source and a drain. The gate is electrically connected to the scan line. Similarly, the source is electrically connected to the data line. The pixel electrode is disposed over the substrate and is electrically connected to the drain. The common line is disposed on the substrate. The pixel electrode covers a portion of the common line. The common line that extends on one side of the data line selves as a repairing section. The repairing section has a first repairing terminal, a second repairing terminal and a cutting region. The first repairing terminal and the second repairing terminal are located underneath the data line, and the cutting region is located between the first repairing terminal and a section of the common line that does not extend along the data line. Furthermore, the pixel electrode does not cover the cutting region. The dielectric layer is disposed over the substrate to cover at least the common line.

The present invention is also directed to a method of repairing the aforementioned pixel structure. A laser beam is applied to fuse the first repairing terminal and the second repairing terminal of the repairing section so that the repairing section electrically connects with the data line. Thereafter, the common line is severed through the cutting region to short between the repairing section and other common line and thereby repair a broken data line.

In the present invention, the first repairing pattern and the second repairing pattern for reparation are formed together with other devices such as data lines and gates. Thereafter, a laser beam can be applied to electrically connect the repairing patterns (or just one repairing pattern) with the data line and the pixel electrode. If one of the pixel electrodes is defective, signals on a data line can be written into the pixel electrode through one of the repairing patterns. On the other hand, if a data line is broken, signals on the data line can bypass the broken data line and transmit through the pixel electrode because the repairing patterns are electrically connected to the data line and the pixel electrode.

Furthermore, a portion of the common line on the substrate can be used as a repairing section. If a signal line is broken, a laser beam can be applied to fuse the repairing section with the data line. Thereafter, the laser beam can be applied to cut open the cutting region on the repairing section. Hence, the signals on the data line can bypass the broken data line and transmit through the pixel electrode and the repairing section.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
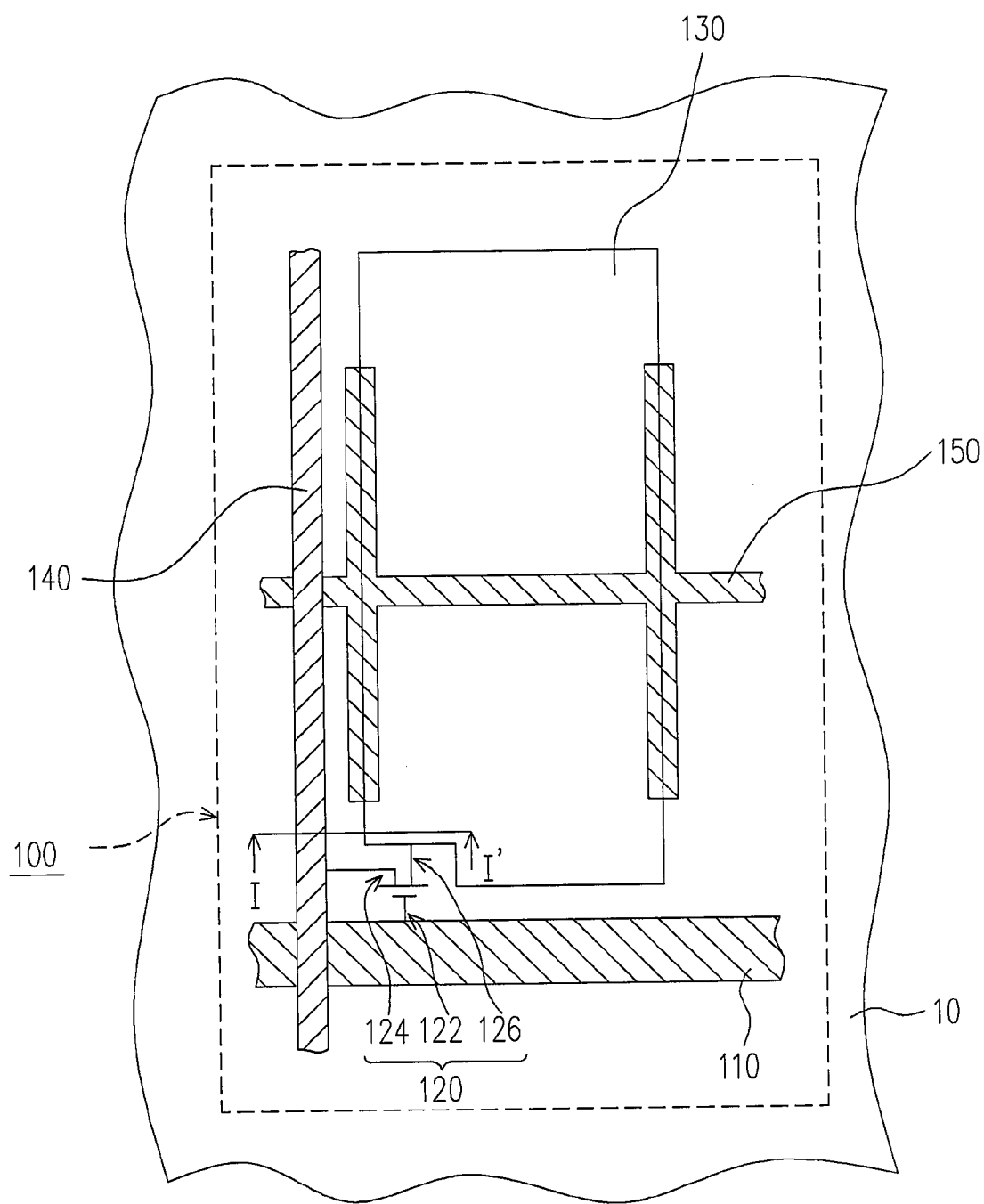
FIG. 1 is a top view of a conventional pixel structure.

Reference will now be made in detail to the present preferred embodiments of the invention, examples of which are illustrated in the accompanying drawings. Wherever possible, the same reference numbers are used in the drawings and the description to refer to the same or like parts.

Figure 2:
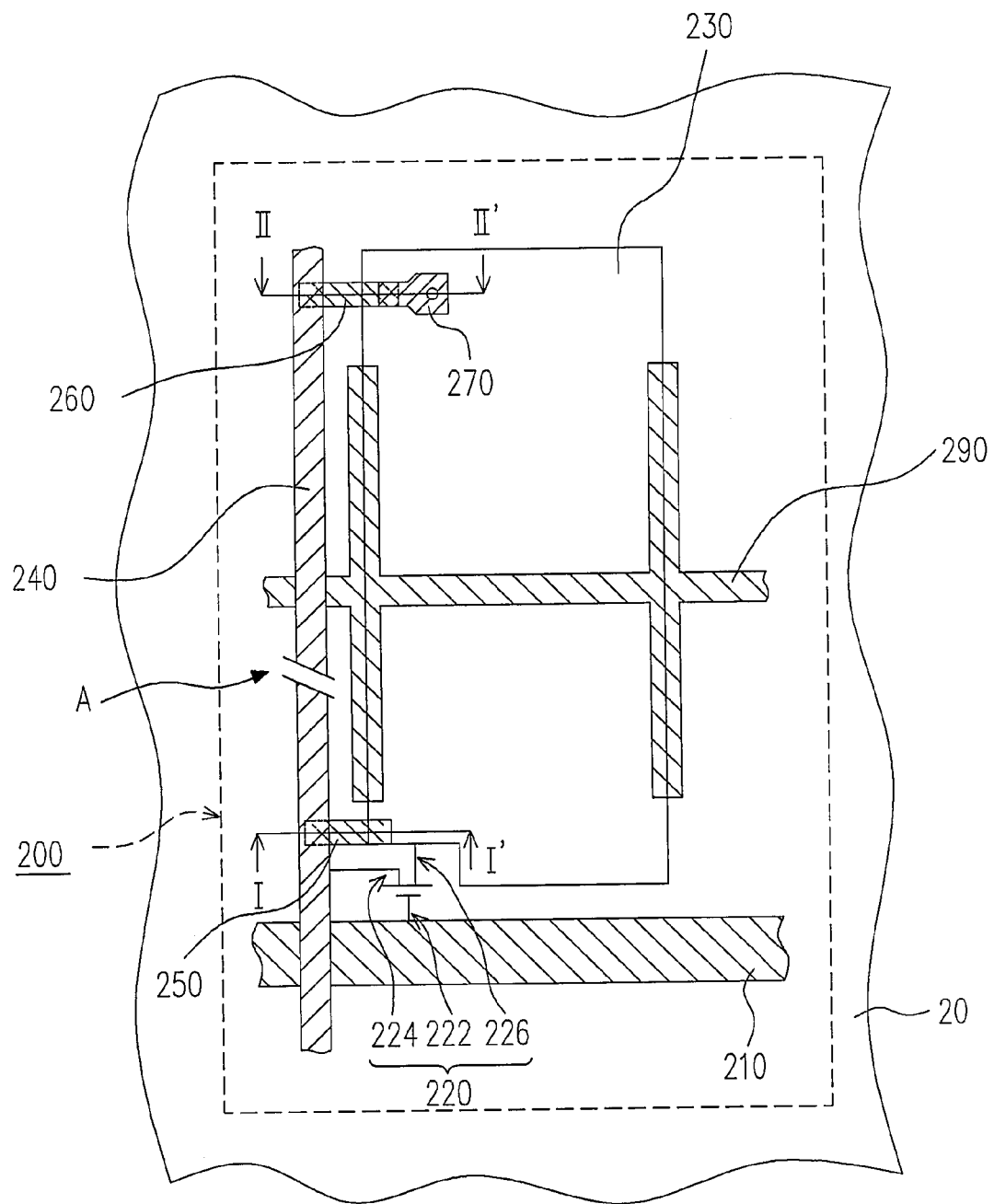
FIG. 2 is a top view of a pixel structure according to one embodiment of the present invention.
Figure 3A:
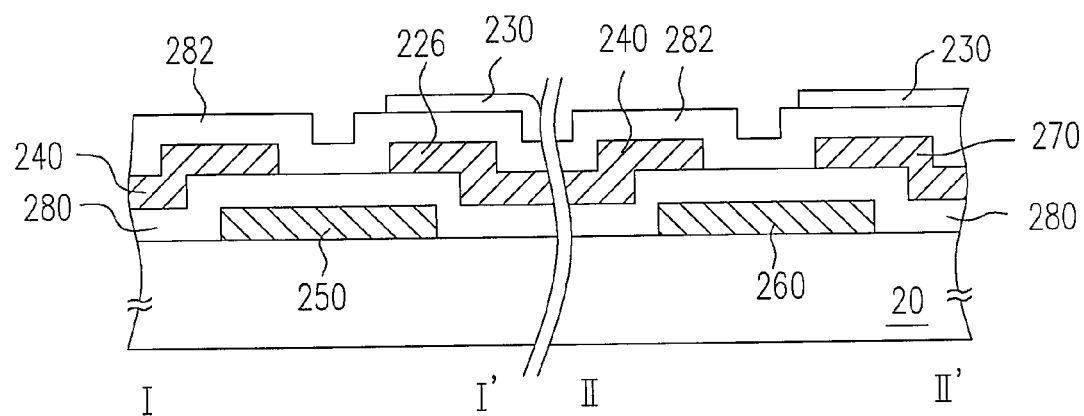
FIG. 3A is schematic cross-sectional view of the pixel structure along line I-I' and line II-II' shown in FIG. 2 showing before performing a repairing operation according to an embodiment of the present invention.

FIG. 2 is a top view of a pixel structure according to one embodiment of the present invention. FIG. 3A is schematic cross-sectional view of the pixel structure along line I-I' and line II-II' shown FIG. 2 before performing a repairing operation according to an embodiment of the present invention. As shown in FIG. 2, the pixel structure 200 comprises a scan line 210, a thin film transistor 220, a pixel electrode 230, a data line 240, a first repairing pattern 250, a second repairing pattern 260, a contact block 270, a dielectric layer 280 (can be seen in FIG. 3A) and a passivation layer 282 (can be seen in FIG. 3A).

The scan line 210 and the data line 240 are disposed over a substrate 20. The thin film transistor 220 is disposed over the substrate 20. The thin film transistor 220 comprises a gate 222, a source 224 and a drain 226. The gate 222 is electrically connected to the scan line 210. Similarly, the source 224 is electrically connected to the data line 240. The pixel electrode 230 is disposed over the substrate 20 and is electrically connected to the drain 226. By controlling the scan line 210, the thin film transistor 220 is able to transmit signals on the data line 240 to the pixel electrode 230.

The contact block 270 is disposed under the pixel electrode 230 and is electrically connected to the pixel electrode 230. The first repairing pattern 250 is disposed over the substrate 20. One end of the first repairing pattern 250 is disposed under the data line 240 while the other end of the first repairing pattern 250 is disposed under the drain 226. The second repairing pattern 260 is disposed on the substrate 20. One end of the second repairing pattern 260 is disposed under the data line 240 while the other end of the second repairing pattern 260 is disposed under the contact block 270. The dielectric layer 280 is disposed over the substrate 20 to cover the scan line 210 so that the scan line 210 and the data line 240 are electrically isolated. Furthermore, the dielectric layer 280 may cover the first repairing pattern 250 and the second repairing pattern 260 so that the first repairing pattern 250 is electrically isolated from the data line 240 and the drain 226 and the second repairing pattern 260 is electrically isolated from the data line 240 and the contact block 270. After fabricating the data line 240, the source 224 and the drain 226, a passivation layer 282 is normally formed over the substrate 20. The pixel electrode 230 and the drain 226 are electrically connected through a contact (not shown) in the passivation layer 282.

In addition, a common line 290 is disposed on the substrate 20 so that a common voltage may be applied. Furthermore, the pixel electrode 230 covers a portion of the common line 290. The dielectric layer 280 is disposed between the pixel electrode 230 and the common line 290. The overlapping region between the pixel electrode 230 and the common line 290 forms a storage capacitor that provides a memory/register function in each pixel unit.

In the process of fabricating the scan line 210 and the common line 290, the first repairing pattern 250 and the second repairing pattern 260 are formed on the substrate 20. In other words, the scan line 210, the common line 290, the first repairing pattern 250 and the second repairing pattern 260 all belong to the same circuit layer. In the process of fabricating the data line 240, the contact block 270 is formed over the substrate 20. In other words, the data line 240 and the contact block 270 also belong to the same circuit layer. The aforementioned pixel structure 200 is specially designed for repairing defective pixel and broken data lines. In the following, a method of repairing the pixel structure 200 is described.

Figure 3B:
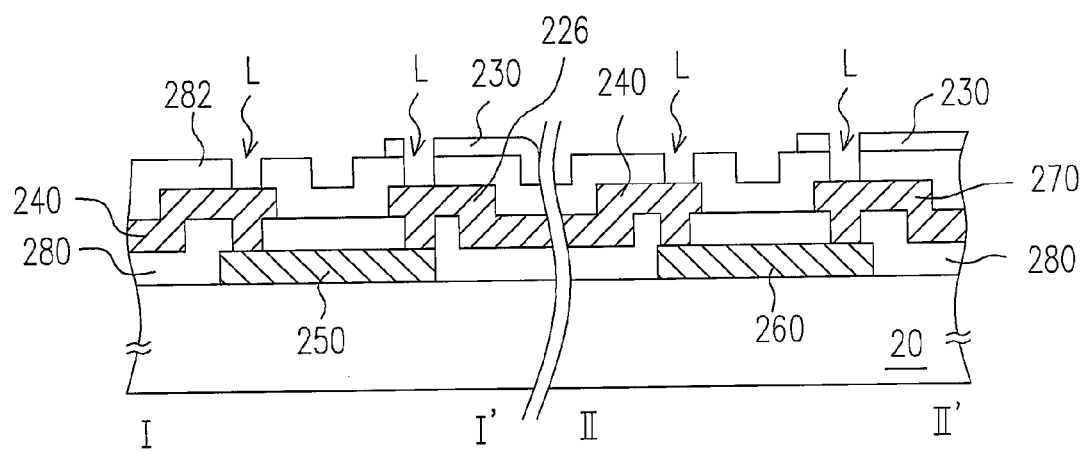
FIG. 3B is a cross-sectional view of the pixel structure shown in FIG. 3A after a repairing operation according to an embodiment of the present invention.

FIG. 3A is schematic cross-sectional view of the pixel structure along line I-I' and line II-II' shown in FIG. 2 before performing a repairing operation according to an embodiment of the present invention. FIG. 3B is a cross-sectional view of the pixel structure shown FIG. 2A after a repairing operation according to an embodiment of the present invention. Any defective pixel can be repaired as shown in FIGS. 3A and 3B. A laser beam L is applied to burn open the pixel electrode 230, the passivation layer 282 and the dielectric layer 280 above the ends of the first repairing pattern 250 in sequence so that the data line 240 and the drain 226 fuse with the first repairing pattern 250. Hence, the first repairing pattern 250 is electrically connected with the data line 240 and the drain 226. Similarly, a laser beam L can be applied to burn open the pixel electrode 230, the passivation layer 282 and the dielectric layer 280 over the ends of the second repairing pattern 260 in sequence. The data line 240 and the contact block 270 fuse with the second repairing pattern 260 so that the second repairing pattern 260 is electrically connected with the data line 240 and the contact block 270. In other words, it is possible to repair any defective pixel by forcing signals on the data line 240 into the pixel electrode 230 through the first repairing pattern 250 (or the second repairing pattern 260).

If the data line 240 is broken at a location marked A in FIG. 2, a laser beam L can be applied to fuse the terminals of the first repairing pattern 250 and the terminals of the second repairing pattern 260. Therefore, the first repairing pattern 250 can be connected with the data line 240 and the drain 226, and the second repairing pattern 260 can be connected with the data line 240 and the contact block 270 to rectify the problem. After the laser repair operation, signals on the data line 240 can bypass the broken data line 240 by transmitting to the pixel electrode via the second repairing pattern 260 and the contact block 270 and returning to the data line 240 via the first repairing pattern 250. Hence, the pixel electrode behind the broken data line may operate normally.

However, some parasitic capacitance may be created as a result of the overlapping of the first repairing pattern 250 and the second repairing pattern 260 with the data line 240 in some regions. The parasitic capacitance often leads to some cross talk between conductive lines. Since display quality may be affected by the cross talk, the present invention also provides a pixel structure capable of reducing such cross talk.

Figure 4:
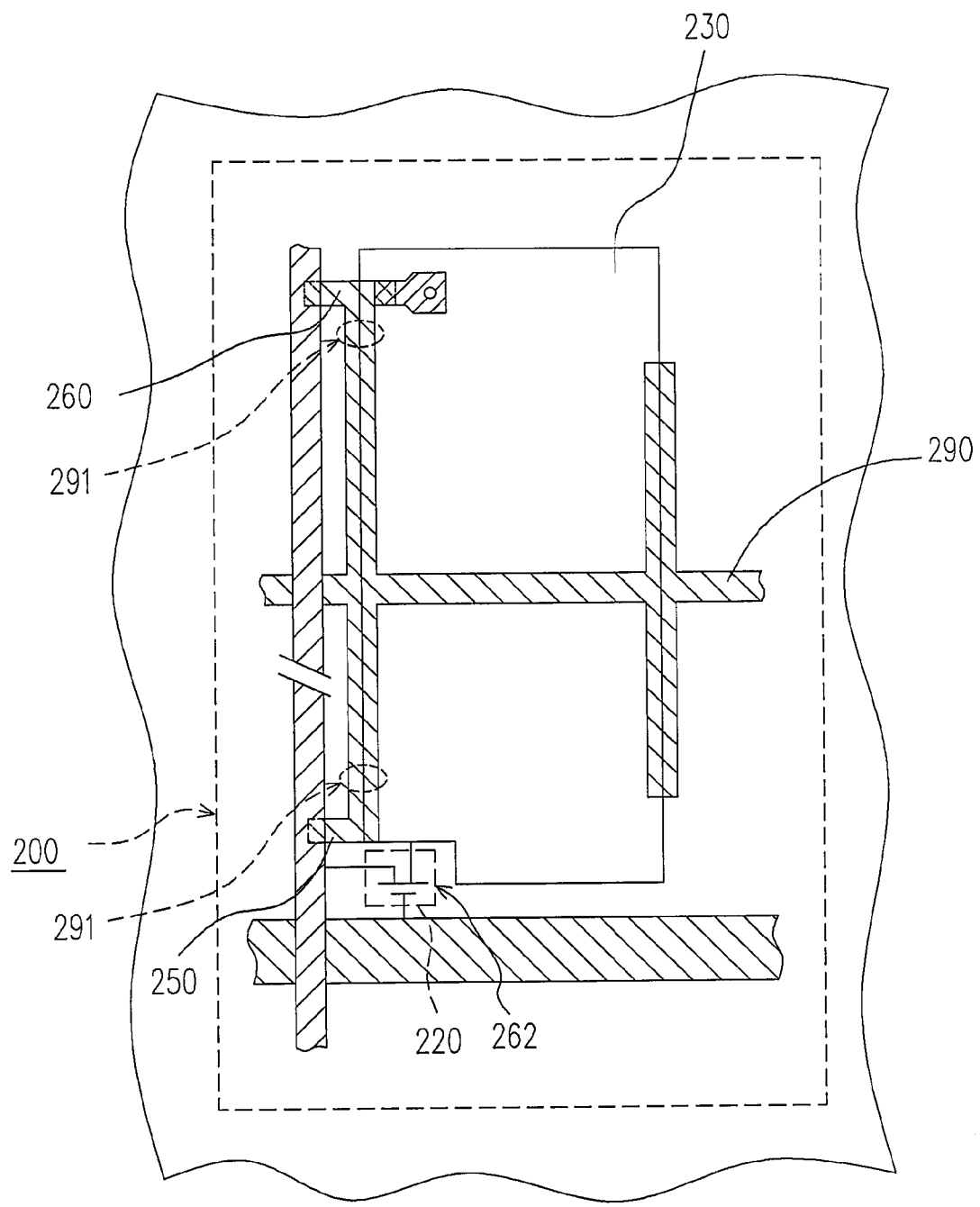
FIG. 4 is a top view showing a pixel structure according to one embodiment of the present invention.

FIG. 4 is a top view of a pixel structure according to another embodiment of the present invention. In the present embodiment, the pixel structure 200 is similar to the aforementioned embodiment. One major difference is that the first repairing pattern 250 and the second repairing pattern 260 are connected to the common line 290. In other words, the first repairing pattern 250 and the second repairing pattern 260 are fabricated together with the common line 290. Since a common voltage is applied to the common line 290, the common voltage can be used to isolate interfering signals and reduce any cross talk between the repairing sections and the data lines.

Because the first repairing pattern 250, the second repairing pattern 260 and the common line 290 are fabricated together in the same process, a process of cutting up the connection between the first repairing pattern 250, the second repairing pattern 260 with the common line 290 is required if a repairing operation is performed in the pixel. Before performing the cutting operation, there is a need to set up cutting regions 291 somewhere along the common line 290, preferably adjacent to the junction between the common line 290 and the first repairing pattern 250 or the second repairing pattern 260.

To repair a defective pixel in the pixel structure 200, a laser beam is applied to fuse the ends of the first repairing pattern 250 so that the first repairing pattern 250 is connected with the data line 240 and the drain 262. Alternatively, the laser beam is applied to fuse the ends of the second repairing pattern 260 so that the second repairing pattern 260 is connected with the data line 240 and the contact block 270. Thereafter, the common line 290 is disconnected from the fused first repairing pattern 250 or the second repairing pattern 260 by cutting the cutting region 291 open. In an embodiment of the present invention, the method of cutting the cutting region 291 includes aiming a low-energy laser beam to form an opening that exposes the common line 290 in the cutting region 291 and cutting the exposed common line 290 by aiming a high-energy laser beam.

To repair a broken data line 240 in the pixel structure 200, a laser beam is applied to fuse the ends of the first repairing pattern 250 and the ends of the second repairing pattern 260. Thus, the first repairing pattern 250 connected with the data line 240 and the drain 262 and the second repairing pattern 260 connected with the data line 240 and the contact block 270. Thereafter, the common line 290 is disconnected from the fused first repairing pattern 250 and the second repairing pattern 260 by cutting the cutting region 291 open. Since the method of severing the connection of the fused first repairing pattern 250 and the second repairing pattern 260 from the common line 290 has already been described, detailed description is not repeated hereinafter.

It should be noted that the pixel electrode 230 also covers the cutting region 291. Therefore, before cutting the common line 190 with a high-energy laser beam, a low-energy laser beam must be used to form the opening in the pixel electrode 230. However, a two-stage laser burning process increases the complexity and risk of the laser repairing operation. In the following, a number of pixel structures capable of reducing the risk and complexity of a laser repair operation are provided.

Figure 5:
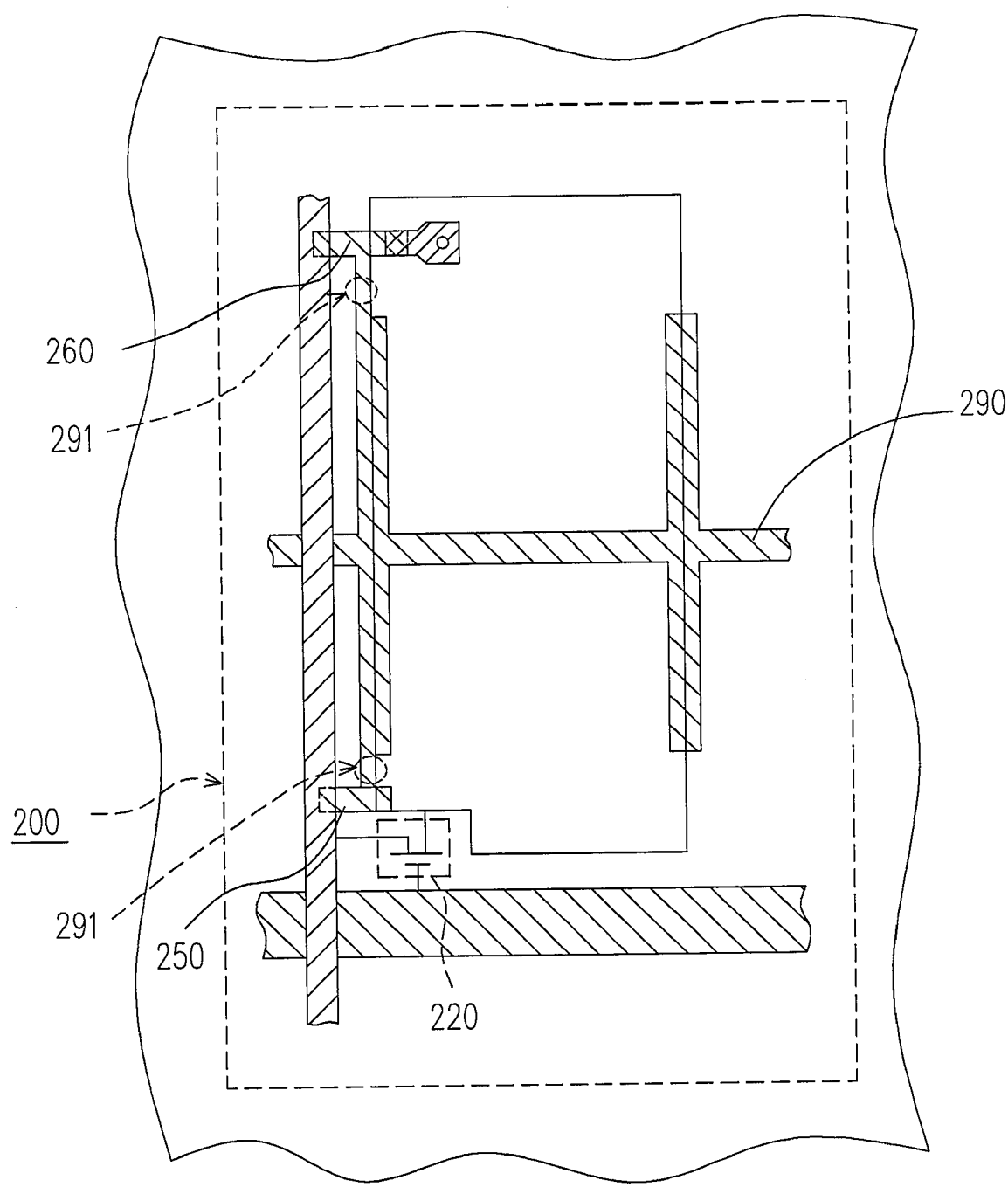
FIG. 5 is a top view showing a pixel structure according to one embodiment of the present invention.

FIG. 5 is a top view of a pixel structure according to another embodiment of the present invention. As shown in FIG. 5, the pixel structure 200 is very similar to the aforementioned embodiment. One major difference is that the cutting region 291 of the common line 290 has a width smaller than other section of the common line 290 so that the pixel electrode 230 no longer cover the cutting region 291. With this design, a high-energy laser beam can be directly applied to cut the common line 290 within the cutting region 291 without a prior low-energy laser burning operation.

Figure 6:
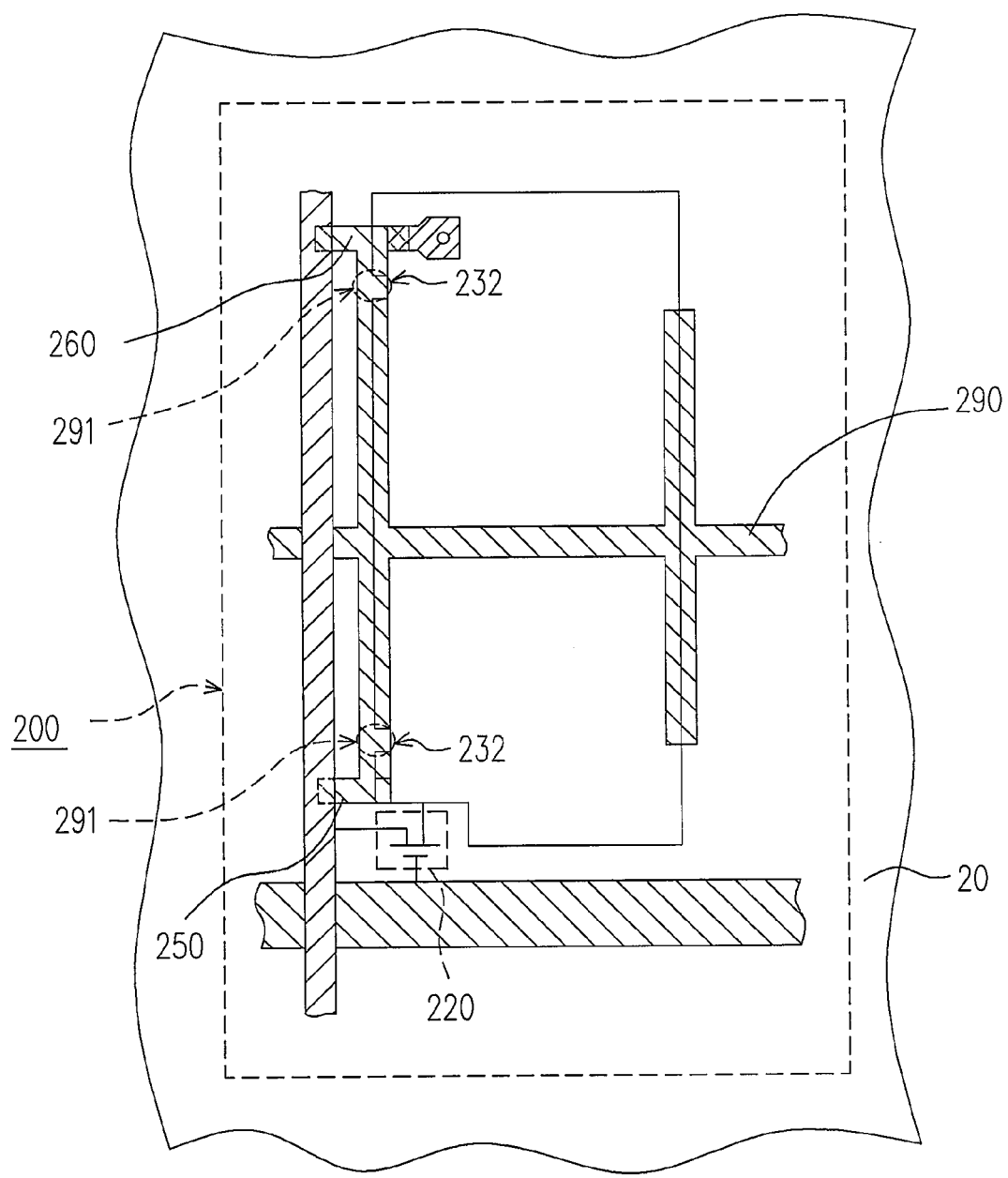
FIG. 6 is a top view showing a pixel structure according to one embodiment of the present invention.

FIG. 6 is a top view of a pixel structure according to an embodiment of the present invention. As shown in FIG. 6, the pixel structure 200 is very similar to the aforementioned embodiment. One major difference is that a recess region 232 is formed in the pixel electrode 230. The recess region 232 is located directly above the cutting region 291 so that the pixel electrode 230 no longer covers the cutting region 291. Hence, a high-energy laser beam can be directly applied to cut the common line 290 within the cutting region 291 without a prior low-energy laser burning operation.

Figure 7:
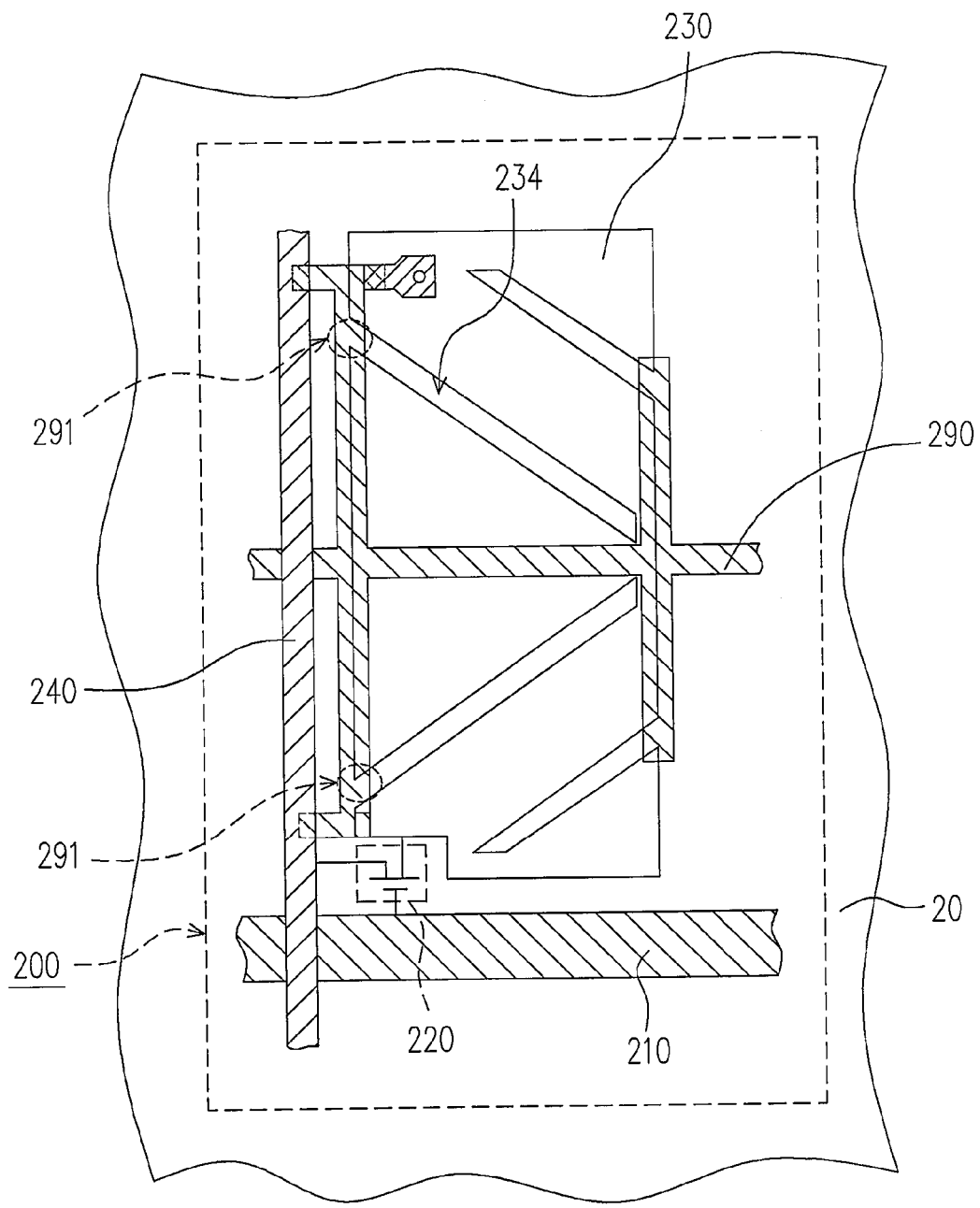
FIG. 7 is a top view showing a pixel structure according to one embodiment of the present invention.

The pixel structure according to the present embodiment of the present invention in which the pixel electrode 230 does not covering the cutting region 291 so that the application of a low-energy laser beam for forming an opening in the pixel electrode 230 is not required and can be applied to a multi-domain vertical alignment liquid crystal display. FIG. 7 is a top view of a pixel structure according to an embodiment of the present invention. As shown in FIG. 7, the pixel structure 200 is very similar to the aforementioned embodiment. One major difference is that the pixel electrode 230 has a plurality of slits 234. The slits 234 mainly serve to vary the electric field between the two substrates so that the liquid crystal between the substrate can have a multi-domain alignment. Ultimately, the viewing angle of the liquid crystal display panel can be improved. In the present embodiment, the slits 234 at the junction between the common line 290 and the first repairing pattern 250 or the second repairing pattern 260 also serve as a cutting region 291 so that the pixel electrode 230 does not cover the cutting region 291. Therefore, a high-energy laser beam can be directly applied to cut the common line 290 within the cutting region 291 and increase laser repair efficiency and yield without a prior low-energy laser burning operation.

Because the repairing pattern, the data line and pixel electrodes are electrically connected in the aforementioned embodiments, signals via the data line can bypass the broken portion of the data line via the repairing pattern to the pixel electrode. However, the present invention is not limited to the bypassing of broken data line via the pixel electrode. An alternative method is to provide a repairing section directly on the common line so that signals can bypass the broken data line via the repairing section to the pixel electrode.

Figure 8:
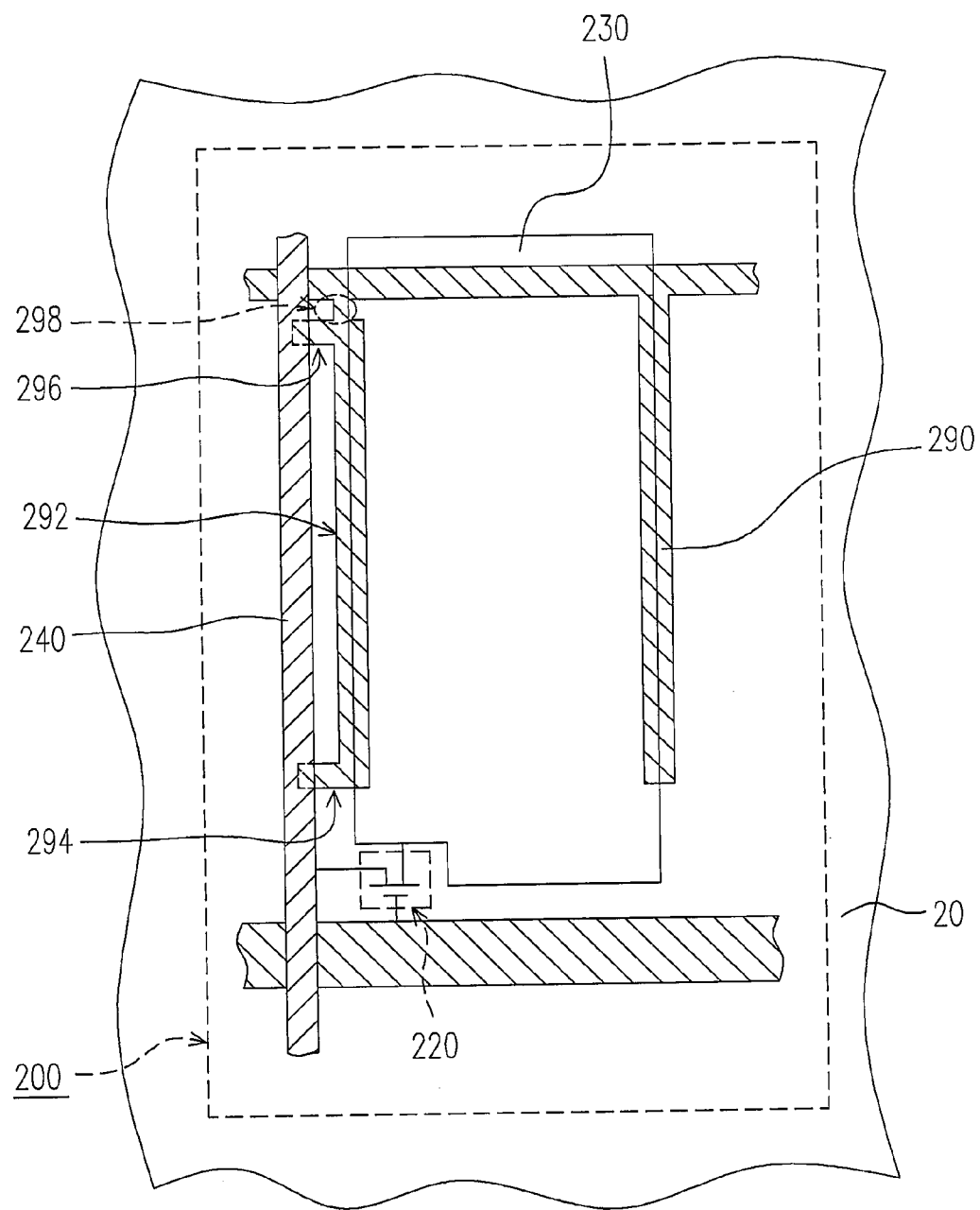
FIG. 8 is a top view showing a pixel structure according to one embodiment of the present invention.
Figure 9:
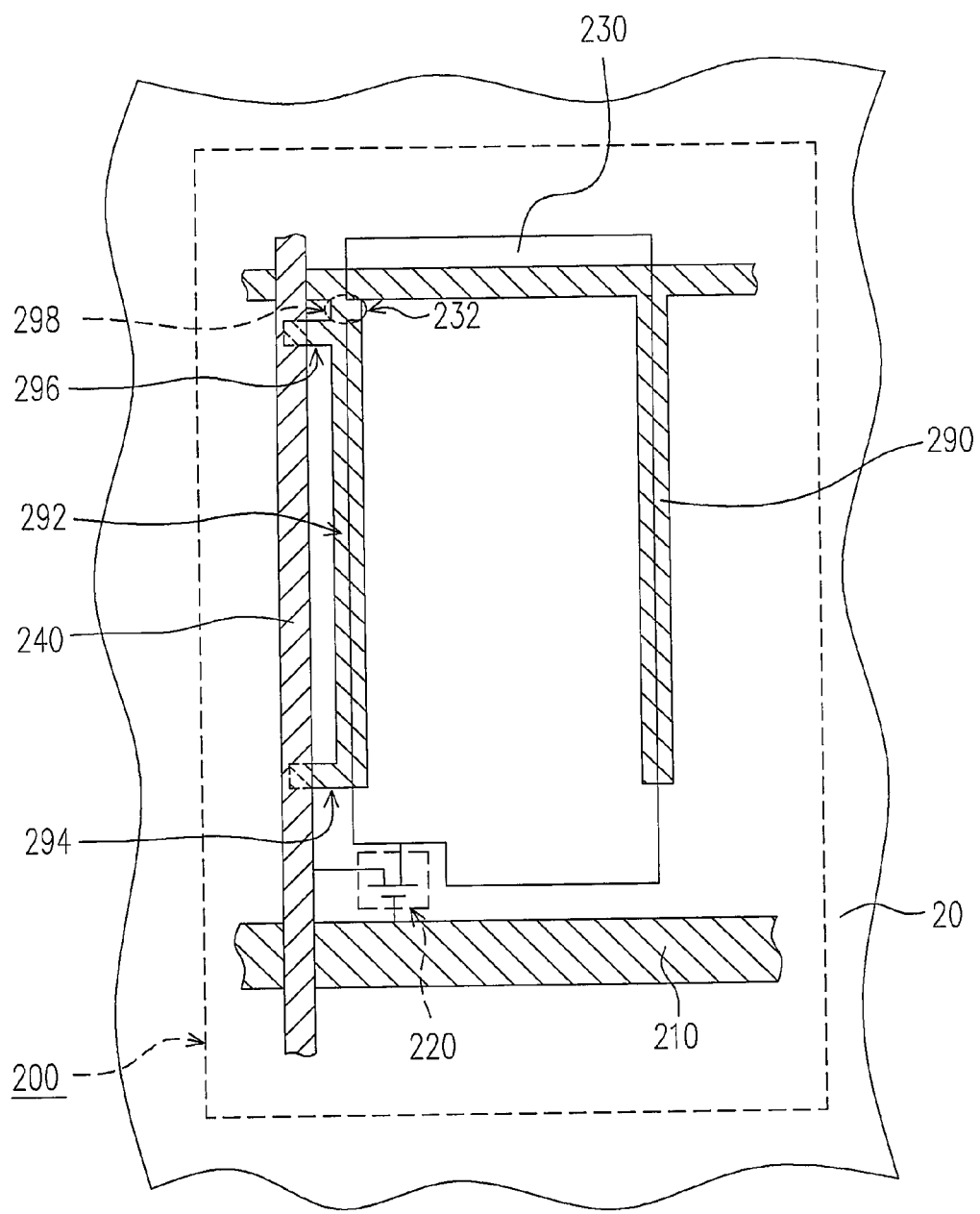
FIG. 9 is a top view showing a pixel structure according to one preferred embodiment of the present invention.
Figure 10:
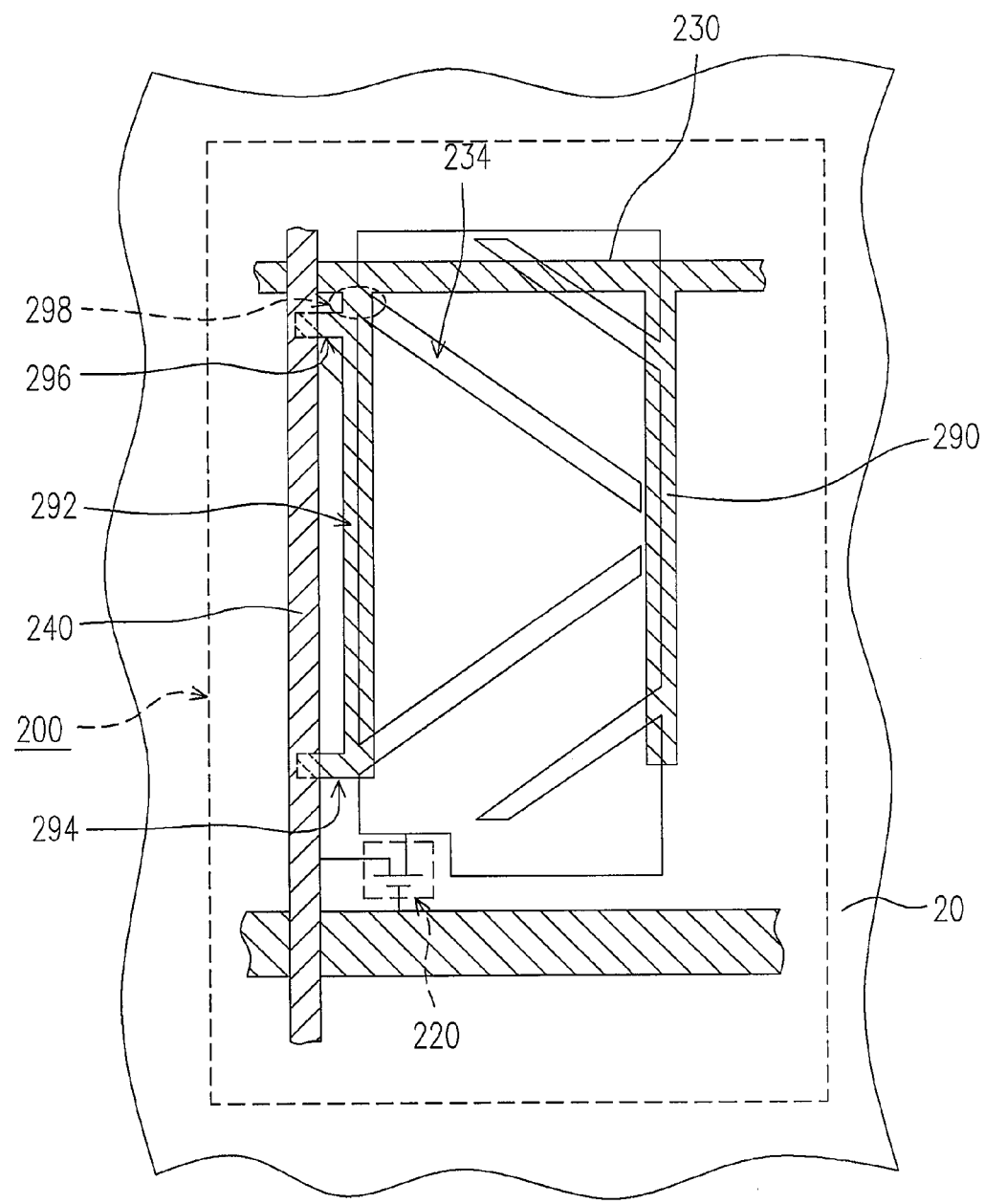
FIG. 10 is a top view showing a pixel structure according to one embodiment of the present invention.

FIGS. 8 through 10 are examples of pixel structures according to various embodiments of the present invention. As shown in FIGS. 8, 9 and 10, the pixel structure 200 essentially comprises a scan line 210, a data line 240, a thin film transistor 220, a pixel electrode 230, a common line 290 and a dielectric layer (not shown). Since the scan line 210, the data line 240, the thin film transistor 220, the pixel electrode 230, the common line 290 and the dielectric layer are setup in a manner similar to the aforementioned embodiments, description of their relationship is omitted. The only major difference is that the common line 290 located beside the data line 240 also serves as a repairing section 292. In fact, the repairing section 292 comprises a first repairing terminal 294, a second repairing terminal 296 and a cutting region 298. The first repairing terminal 292 and the second repairing terminal 294 are positioned under the data line 240. The cutting region 298 is positioned between the first repairing terminal 294 and the section of the common line 290 that does not extend along the data line 240. Furthermore, the pixel electrode does not cover the cutting region 298. The dielectric layer is disposed over the substrate 20 so that at least the common line 290 is covered.

In FIG. 8, the cutting region 298 is designed to have a width smaller than other sections of the common line 290 so that the pixel electrode 230 no longer covers the cutting region 298. In FIG. 9, a recess region 232 is formed in the pixel electrode 230. The recess region 232 is formed directly above the cutting region 298 so that the pixel electrode 230 no longer covers the cutting region 298. In FIG. 10, a plurality of slits 234 is formed on the pixel electrode 230 of an MVA liquid crystal display. One end of the slits 234 is disposed over the cutting region 298 so that the pixel electrode 230 no longer covers the cutting region 298.

Since all the cutting regions 298 in FIGS. 8 through 10 are exposed by the pixel electrode 230, the pixel electrode 200 can be repaired in a similar manner as described below. First, a laser beam is applied to fuse the first repairing terminal 294 and the second repairing terminal 296 of the repairing section so that the data line 240 can be connected with the repairing sections 294 and 296. Thereafter, the common line 290 is cut through the cutting region 298 so that the repairing section 292 is disconnected from the common line 290.

Because the repairing section 292 is a part of the common line 290 prior to a repair operation, the common voltage applied to the common line 290 can be utilized to reduce interfering signals. Furthermore, with the pixel electrode 230 exposing the cutting region 298, a high-energy laser beam can be applied to cut the common line 290 in the cutting region 298 without having to form an opening using a low-energy laser beam first. Ultimately, both the efficiency and yield of the laser repair operation are improved.

In summary, the first repairing pattern and the second repairing pattern for repairing a pixel are formed together with other devices such as data lines and gates. Thereafter, a laser beam can be applied to fuse the repairing patterns (or just one repairing pattern) with the data line and the pixel electrode. If one of the pixel electrodes is defective, signals on a data line can be transmitted to the pixel electrode through one of the repairing patterns. On the other hand, if a signal line is broken, signals via the data line can bypass the broken data line via the pixel electrode as the repairing patterns are electrically connected to the data line and the pixel electrode.

Furthermore, a portion of the circuit of the common line over the substrate can be used as a repairing section. If a signal line is broken, a laser beam can be applied to fuse the repairing section and the data line. Thereafter, the laser beam can be applied to cut open the cutting region on the repairing section. Hence, the signals via the data line can bypass the broken data line via the pixel electrode and the repairing section.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel structure, comprising:
   a substrate;
   a scan line and a data line, disposed over the substrate;
   a thin film transistor, disposed over the substrate, wherein the thin film transistor comprises a gate, a source and a drain such that the gate is electrically connected to the scan line and the source is electrically connected to the data line;
   a pixel electrode, disposed over the substrate and electrically connected to the drain;
   a common line, disposed over the substrate such that the pixel electrode covers a portion of the common line, wherein the common line adjacent to the data line serves as a repairing section, the repairing section comprises a first repairing terminal, a second repairing terminal and a cutting region, the first repairing terminal and the second repairing terminal are disposed under the data line and the cutting region is disposed between the first repairing terminal and the section of the common line that does not extend along the data line, and the pixel electrode does not cover the cutting region; and
   a dielectric layer, disposed over the substrate covering at least the common line.

2. The pixel structure of claim 1, wherein the cutting region has a width narrower than other section of the common line so that the pixel electrode does not cover the cutting region.

3. The pixel structure of claim 1, wherein the pixel electrode comprises a recess region directly above the cutting region so that the pixel electrode does not cover the cutting region.

4. The pixel structure of claim 1, further comprising slits such that the slits extend over the cutting region so that the pixel electrode does not cover the cutting region.

5. A method of repairing the pixel structure claimed in claim 1, comprising the steps of:
   fusing the first repairing terminal and the second repairing terminal of the repairing section using a laser beam so that the repairing section connects with the data line; and
   cutting the common line within the cutting region to disconnect the repairing section from other common line sections.

* * * * *